United States Patent [19]
Coughlan et al.

[11] Patent Number: 4,762,455
[45] Date of Patent: Aug. 9, 1988

[54] REMOTE MANIPULATOR

[75] Inventors: Joel B. Coughlan, Knox County; Howard W. Harvey, Roane County; R. Glen Upton, Anderson County; John R. White, Roane County, all of Tenn.

[73] Assignee: Remote Technology Corporation, Oak Ridge, Tenn.

[21] Appl. No.: 56,423

[22] Filed: Jun. 1, 1987

[51] Int. Cl.⁴ .................... B25J 3/00; G21C 19/00
[52] U.S. Cl. ............................. 414/4; 901/8; 901/23; 901/28; 376/260; 376/248
[58] Field of Search ............... 376/260, 249, 248; 414/1, 2, 4, 8; 901/8, 23, 24, 28

[56] References Cited

U.S. PATENT DOCUMENTS

| | | | |
|---|---|---|---|
| 2,858,947 | 11/1958 | Chapman, Jr. | 414/5 |
| 2,978,118 | 4/1961 | Goertz et al. | 414/7 |
| 3,128,887 | 4/1964 | Le Guennec et al. | 414/8 |
| 3,164,267 | 1/1965 | Jelatis et al. | 414/7 |
| 3,425,569 | 2/1969 | Haaker | 414/8 |
| 3,481,494 | 12/1969 | Walischmiller | 414/1 |
| 3,923,166 | 12/1975 | Fletcher et al. | 414/4 |
| 4,196,049 | 4/1980 | Burns et al. | 414/1 |
| 4,221,516 | 9/1980 | Haaker et al. | 414/5 |
| 4,298,300 | 11/1981 | Francois et al. | 414/2 |
| 4,370,091 | 1/1983 | Gagliardi | 414/4 |
| 4,460,302 | 7/1984 | Moreau et al. | 414/5 |
| 4,650,388 | 3/1987 | Frioux et al. | 414/1 |
| 4,717,303 | 1/1988 | Kawai | 414/1 |

FOREIGN PATENT DOCUMENTS 0218139  4/1987  European Pat. Off. ........... 376/260

OTHER PUBLICATIONS

"FBR Fuel Cycle", *NEI*, p. 44, 2/87.
"Evolving Toward Projected Man", *Nuclear News*, pp. 127-132, 6/82.

Primary Examiner—Deborah L. Kyle
Assistant Examiner—Daniel Wasil
Attorney, Agent, or Firm—Pitts and Brittian

[57] ABSTRACT

A remote manipulator for radiation cells and the like. This device is an all electric manipulator for hazardous environments to follow the basic movements of the operator but to provide features to provide extended use of the manipulator beyond the capabilities of the operator when necessary or desired. Identical arm units are removably positioned on opposite sides of a torso to make up the slave unit. Joints in the arms are enclosed in rotable boots. By being identical, the arms may be attached to either side of the torso as well as necessitating fewer replacement parts. The motion of each of the arms is sufficient such that essentially any position of one arm relative to the other arm can be achieved. Many components are interchangeable. Electrically controlled pan/tilt heads mounted on the torso support video cameras to permit remote viewing. A unique control system is utilized to interact between the slave unit and the master unit to accomplish the range of motions to the slave unit that may be desired for any particular application. The subcomponents of each of the arms may be removed for replacement and/or maintenance operations. Electrical connection between each major component attached to the torso is made as part of the junction of the components. Thus, the only exterior cable is that between the torso and the control system.

18 Claims, 10 Drawing Sheets

REMOTE MANIPULATOR

TECHNICAL FIELD

This invention relates generally to remotely controlled machines, and more particularly to an all electric master-slave manipulator system specifically designed to perform remote operations and maintenance work within high radiation nuclear cells. The manipulator follows the basic movement of the operator but provides features to extend the use of the manipulator beyond the reach capabilities of the operator when necessary or desired.

BACKGROUND ART

In today's ever expanding range of technologies, there are numerous applications for a manipulator to perform operations which normally would be provided by a human being, but these operations are to be carried out in an environment that may be detrimental to the individual. Typical of such environments is that associated with the nuclear industry. Within that industry there are numerous applications where radioactive material must be handled which would be normally harmful to the individual. Handling of this material ranges from taking samples of liquids, gases and solids, disassembly of components which have contained or been subjected to nuclear radiation of some form wherein a residual radiation level exists, or the operation of apparatus under conditions wherein potentially dangerous nuclear radiations exist. Such operations are normally carried out in units referred to as "hot cells" which are rooms of varying sizes surrounded by walls giving adequate protection to humans from the radiation involved. In order to carry out the various operations that are desired with these materials, numerous types of remote manipulators have been developed such that the operations which normally would be conducted by an individual may be performed using a "slave" portion of the manipulator as directed from a "master" portion. The operator, through the manipulation of the master, accomplishes the various operations using the slave portion. Usually the operator is provided with a viewing window and/or a closed circuit television system so that the interior of the cell can be observed during the particular operation.

Various types of manipulators have been developed in the course of the nuclear industry history. Some of these use completely mechanical systems wherein there is a direct mechanical connection between the master and the slave. These manipulators penetrate some type of opening in the cell wall with appropriate shielding preventing the escape of radiation into the area occupied by the operator. Other manipulator systems use an all electric system and still others utilize a mixture thereof. Typical of the manipulators that have been developed are those shown and described in U.S. Pat. Nos. 3,164,267 issued Jan. 5, 1965 to D. G. Jelatis, et al; 3,425,569 issued to L. W. Haaker on Feb. 4, 1969; 3,481,494 issued on Dec. 2, 1969, to H. Walischmiller; 3,923,166 issued to D. A. Kugath, et al. on Dec. 2, 1975; 4,298,300 issued to D. Francois; et al. on Nov. 3, 1981; 2,978,118 issued to R. C. Goertz, et al., on Apr. 4, 1961; 2,858,947 issued to H. G. Chapman, Jr. on Nov. 4, 1958; 4,370,091 issued to Gagliardi on Jan. 25, 1983; and 4,460,302 issued to C. Moreau on July 17, 1984. None of these devices, nor any combination thereof, is known that will meet the demands of the current remote manipulating art.

A review of the above-identified patents and other references describing various types of remote manipulators will reveal that these devices are complex in nature. They involve in some instances several motors, gears, and various types of drive trains, all of which are subject to failure of some type or other. It will be recognized that once any of these devices have been utilized in an environment where nuclear radiation is present, the devices themselves must be handled remotely if maintenance is to be performed. Furthermore, the presence of radiation is generally detrimental to lubrication and various physical characteristics of the materials employed in the manipulators which further produces various types of required maintenance or refurbishing. For any of the known manipulators the maintenance or refurbishing takes the manipulator out of operation for a substantial period of time since all of the manipulators must be decontaminated and taken to an additional cell for such action.

Not only is it desirable that a manipulator be able to perform the operation normally associated with a person, which includes all of the normal arm functions, but also it would be desirable to be able to extend the reach operations of the slave unit over and above those that are available to an operator at the master unit. This may be necessary because of the location of an object within the cell upon which work is to be performed. For example, the object may be well above the normal reach of a manipulator if the manipulator only follows the operations of an operator's arm. Except for some extensible capabilities (see U.S. Pat. No. 3,425,569), the other manipulators have very limited capabilities.

Accordingly, in view of the deficiencies of other master-slave manipulators, it is one object of the present invention to provide a manipulator wherein each arm or major components thereof of the slave portion may be readily removed and replaced as needed for maintenance and/or repair.

It is still another object of the invention to provide an all electric manipulator for use in hot cells and the like which will follow the basic movements of an operator but provide features to extend the use of the manipulator beyond the capabilities of the operator when necessary or desired.

It is another object to provide a manipulator which may be operated with the slave arms operable in either an "elbows up" or "elbows down" position to enhance the capabilities of the device.

It is also an object of the present invention to provide for interchangability of the arms of the slave portion, and components thereof, so as to minimize the inventory of components for manipulators.

It is a further object of the present invention to provide a manipulator that has self maintenance and repair capabilities whereby no additional manipulator is required for many types of such maintenance and repair.

It is an additional object of the present invention to provide an all electric manipulator wherein electrical coupling of interchangable components thereof occurs when the components are mechanically coupled.

Another object of the present invention is to provide a manipulator having a lift capacity to weight ratio of about 1:1.

Still another object of the present invention is to provide an improved boot member to encase joints thereof.

Further objects of the invention will become apparent upon a consideration of the drawings and the description as set hereinafter.

DISCLOSURE OF THE INVENTION

In accordance with the present invention, an all electric manipulator is provided wherein all components are interchangeable between the slave arms, and the slave arms themselves are interchangeable to opposite sides of a common torso. The arms or major portions thereof are readily removed and replaced so as to substantially simplify maintenance of any type by providing a manipulator and wherein the arm portions may be operated either in an elbows up or elbows down position. Substantially greater reach capability is achieved within a manipulator system than would be available through the normal operation by an operator through the use of a "ratcheting" technique accomplished through the control system. A significant feature of slave portion is the entire internal electrical wiring, with major junctions in the wiring occuring at the points of disconnect of the mechnical components. Moving joints of the slave unit are encased in flexible boots with one end thereof rotatable about its support member.

BEST MODE FOR CARRYING OUT THE INVENTION

Figure 1:
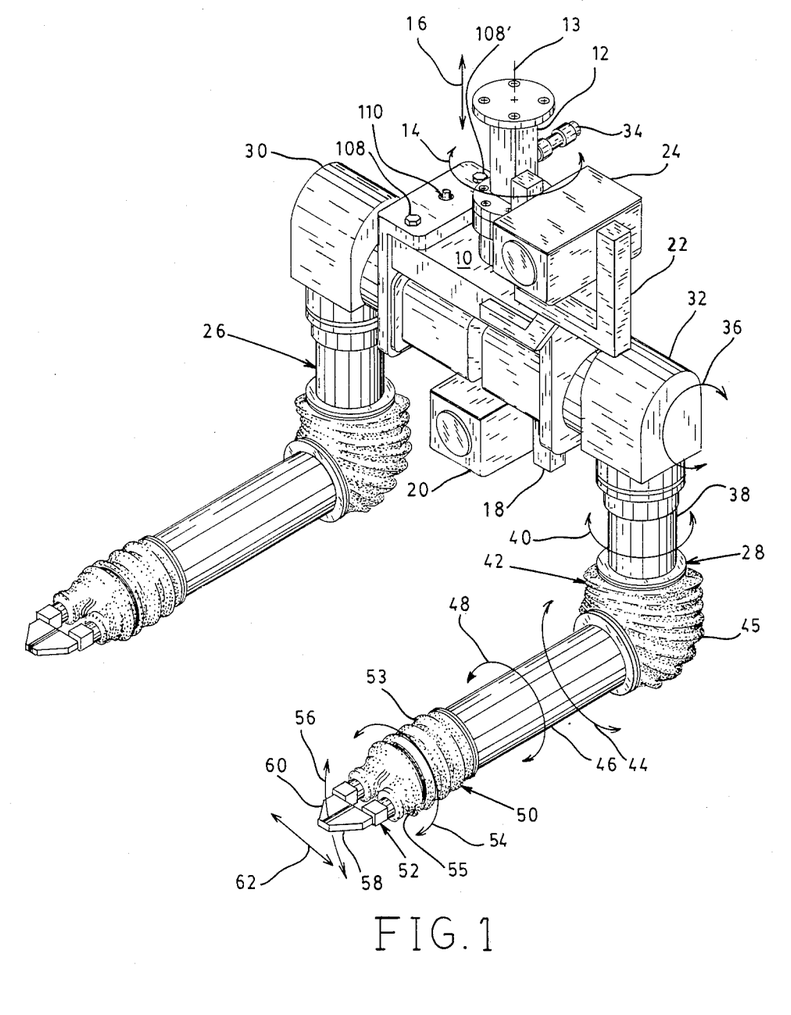
FIG. 1 is a schematic drawing of the slave portion of the present invention illustrating the major components and the various motions that can be achieved therewith.

Referring now to FIG. 1, shown therein is a schematic drawing of the slave portion of the present invention. The central portion of the slave is a torso 10 attached to a support 12 which may take several forms. It can be, for example, a portion of an overhead crane traveling on an overhead carriage (not shown). The torso 10, by means described hereinafter, is adapted to move about an axis 13 of support 12 as shown by the arrow 14. Furthermore, means can be provided within the support 12 to provide for vertical motion as indicated by the arrow 16. Beneath the torso 10 is a pan/tilt support 18 to which can be attached a video camera 20. Preferably the torso supports a second pan/tilt unit 22 having another video camera 24. These pan/tilt units are described in co-pending patent application Ser. No. 017,564, filed Feb. 24, 1987, now U.S. Pat. No. 4,728,839, the details of which are incorporated herein by reference. Although not shown, lights can be provided on the pan/tilt support(s) to provide sufficient illumination for the operation of the cameras. The torso 10 supports a pair of arms 26, 28 as indicated. Details of the support are given in a discussion of shoulder units 30, 32. The arms typically are spaced apart approximately the normal spacing of the arms of the operator. Electrical connectors 34 (one shown) are carried by the torso 10 such that they serve as the main electrical connection for the slave unit. Preferably, one connector is used for power connections and one for signal connections.

Since both of the arms are identical, the features of only one arm will be described herein. Extending radially from the torso 10 is a shoulder element 32. Mechanism associated with the shoulder provides for a rotary motion 36 thereof. Rotatably attached to the shoulder 32 is an upper arm 38 having rotary motion as indicated by the arrow 40. This upper arm is attached to an elbow 42 having associated mechanism to achieve bending motion as is indicated by the arrow 44. The elbow is encased with a boot 45. Projecting from the elbow 42 is a forearm 46 which is caused to be rotated as indicated by the arrow 48. This forearm connects to a wrist unit 50 which, in turn, is connected to a hand 52. The junction of the forearm/wrist/hand is encased with a pair of separate "boots" 53, 55. Mechanism is provided in the wrist to achieve two motions as indicated by the arrows 54 and 56. The hand 52, in the form of tong fingers 58, 60 is provided with mechanism to move the tong fingers towards and away from each other as indicated by the arrow 62. From a review of this figure, it may be seen that all of the motions normally accomplished with a human arm are also accomplished with an arm of the slave unit. Furthermore, certain of the motions, such as rotation, are permitted over a wider range than would be normally accomplished by a human arm. This increased capability will be described in more detail hereinafter particularly a description of FIG. 3. Also, details of the slave arm components are given hereinafter.

Figure 2:
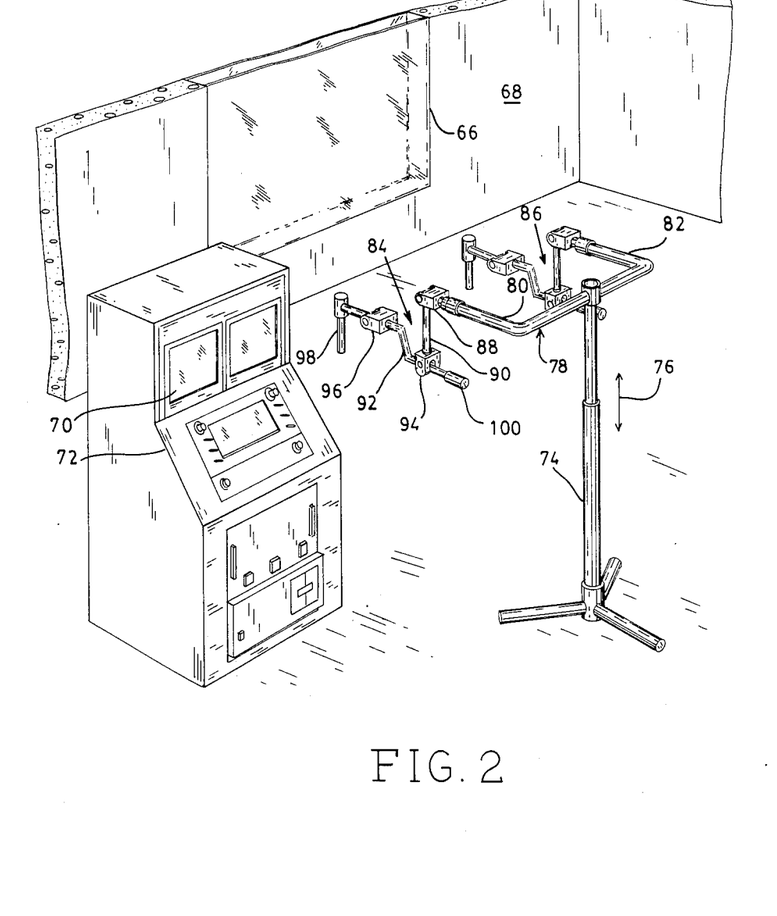
FIG. 2 is a drawing illustrating the master control portion of the manipulator showing the structure as having arms with the elbows oriented down.
Figure 3A:
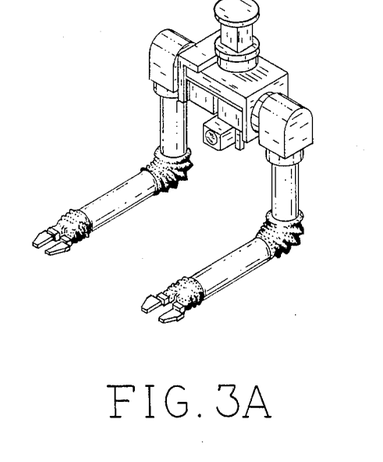
FIGS. 3A through 3D are schematic drawings illustrating some of the positional capabilities of the slave portion of the manipulator of the present invention.
Figure 3B:
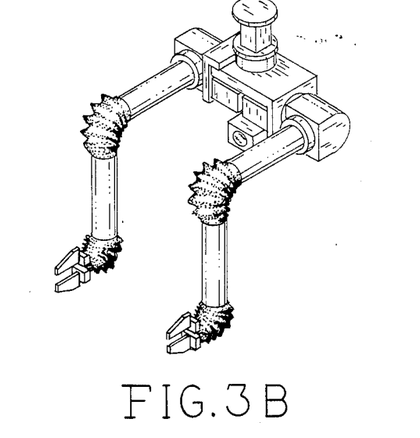
Figure 3C:
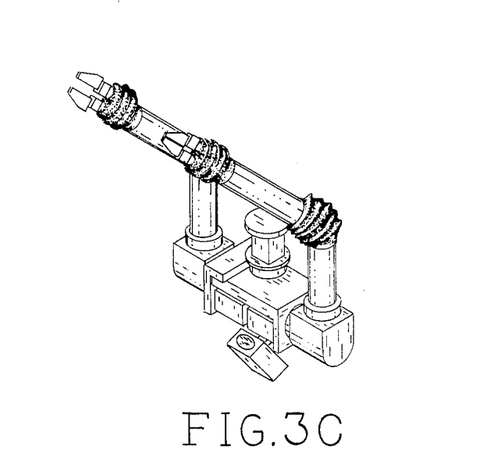
Figure 3D:
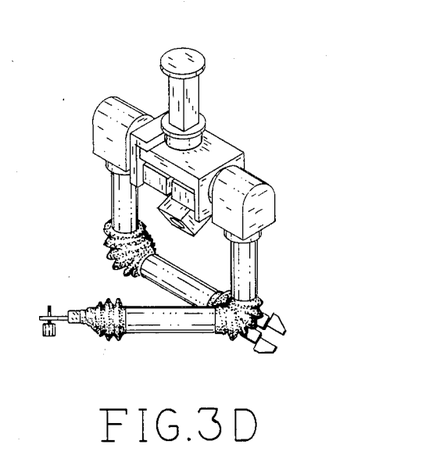

The operator portion of the present invention is illustrated in FIG. 2. Typically, an operator (not shown) positions himself/herself in front of a viewing window 66 located in a wall 68 separating the operator from a cell wherein the slave unit is operated. Alternatively or in combination with direct viewing, the operator may use a video monitor(s) 70. The video monitor(s) (70) are typically mounted in a cabinet 72 which is used to support an assemblage of electronic components associated with the device.

Positioned behind the operator is an upright stand 74 which is adjustable in height as is indicated by the arrow 76. Supported at the top of the stand 74 and projecting above the operator is a U-shaped frame 78, the arms 80, 82 of which are spaced apart a distance approximately equal to the shoulder spacing of the operator. Supported from each of the frame is an operator-controlled arm such as 84, 86. Since both of these operator arms are identical, the components of only one will be described. Pivotably attached to the frame arm 80 by means of a shoulder 88, is an upper arm 90. This upper arm is connected to the forearm 92 through an elbow 94. It may be seen that in this master arm the elbow 94 is positioned in an always "elbows down" position. The end of the forearm terminates in a wrist unit 96 which attaches to a hand 98. Although not shown in this figure, the hand contains several switches for utilization by the operator as will be described hereinafter. In order that a minimum of effort is expended by an operator in moving the arm 84, a counterweight 100 is connected to the elbow 94.

Referring now to FIG. 3, four typical positionings of the manipulator slave unit are illustrated. In FIG. 3A, for example, the manipulator arms are both shown as being in the "elbows down" position, a position which is most like the normal position of a human. Then in FIG. 3B it may be seen that the shoulders, upper arms and wrist have been rotated to achieve an "elbows up" position. This figure also shows that the hands have been rotated to a different orientation. In FIG. 3C the arms are shown in a reaching up position which is accomplished by a further rotation of the shoulder units and a straightening of the elbows. It may be seen that the pan/tilt supports for the video cameras and any lights have also been elevated so that these units are directed towards the position at which the tong units are to be operated. Then in FIG. 3D the two arms are shown as crossing one another. It will be apparent to one versed in the art that other combinations of arm movements can be achieved where one arm is in a different orientation than the other arm in order to perform a specific operation within the cell.

Figure 4:
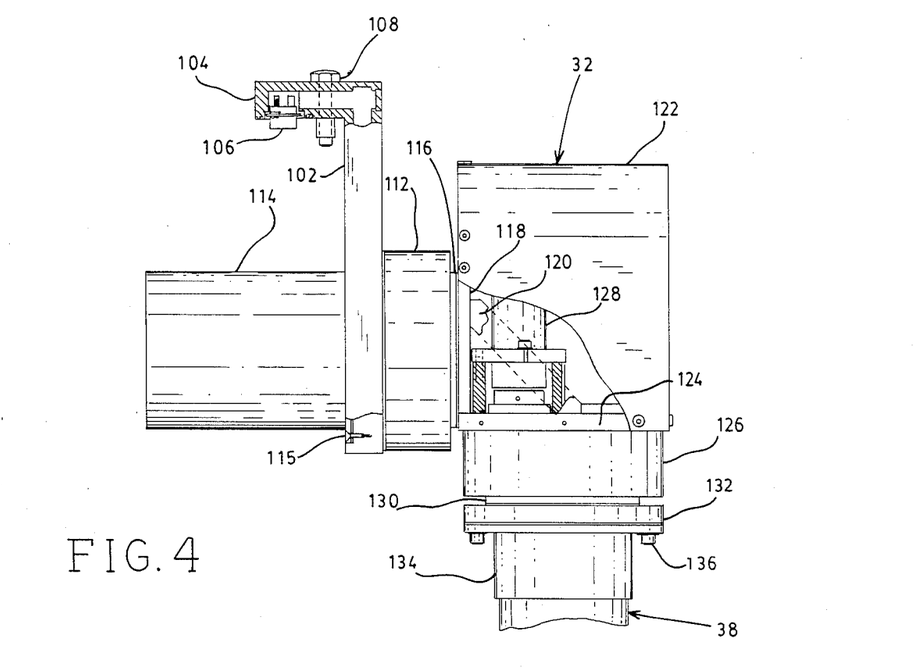
FIG. 4 is a cross-sectional drawing showing the essential components of a shoulder unit of a slave arm of the present invention.

A cross-sectional view, with some components cut away, of a typical shoulder unit (e.g. shoulder unit 32) of the present invention is illustrated in FIG. 4. A vertically orientated plate 102 is provided for releasable attachment to the torso 10 (not shown in this Figure). This plate 102 has a horizontal extension 104 to rest on top of the torso. The extension 104 is provided with one-half of at least one electrical connector means 106, with the other one-half of the connector means carried by the torso. Preferably this connector means is a pair of electrical connectors: one for power and one for signal. When the shoulder 32 is placed on the torso, these electrical connection portions are joined. When the shoulder is removed from the torso, the connector portions are separated.

Actual connection of the arm to the torso is accomplished by use of a pair (one shown) of captive bolts 108 together with at least one indexing pin (see FIG. 1) affixed to the top surface of the torso. (Both bolts 108, 108' and the pin 110 are shown in FIG. 1). Attached, as with bolts (not shown) to the support plate 102 is a gear box 112 for providing motion to the shoulder unit 32. This gear box has input motion provided by a motor 114, releasably attached to the plate 102, as with bolts 115. This motor 114 is provided with a position sensor (not shown) for purposes described hereinafter. The same type of motor and gear box are utilized to provide the above-mentioned rotation of the torso 10. An output ring 116 of the gear box is attached to an L-shaped mounting plate 118 as with bolts. Typically, a brace 120 within the shoulder unit 32 assures proper rigidity of the shoulder unit, and this shoulder unit is enclosed with a cover 122.

Attached to the leg 124 of the mounting plate 118 is a second gear box 126 which receives input driving power from a motor 128. This motor is also provided with a position sensor (not shown), typically a potentiometer. The gear box 126 and motor 128 are identical to the gear box 112 and motor 114. The gear box has an output ring 130 to which is releasably attached an upper arm mounting plate 132. Releasably attached to this mounting plate is an upper arm cover 134 as with bolts 136. It may be seen from this drawing that the shoulder unit 32 may be moved in a 240 degree circle around a horizontal axis, according to the motion 36 shown in FIG. 1, through the use of the motor 114 and the gear box 112. In addition, motion 40 (see FIG. 1) is achieved through the use of motor 128 and gear box 126. This later motion, typically a 240 degrees rotation, is that provided for the upper arm 38 of the slave portion of the present invention.

Figure 5:
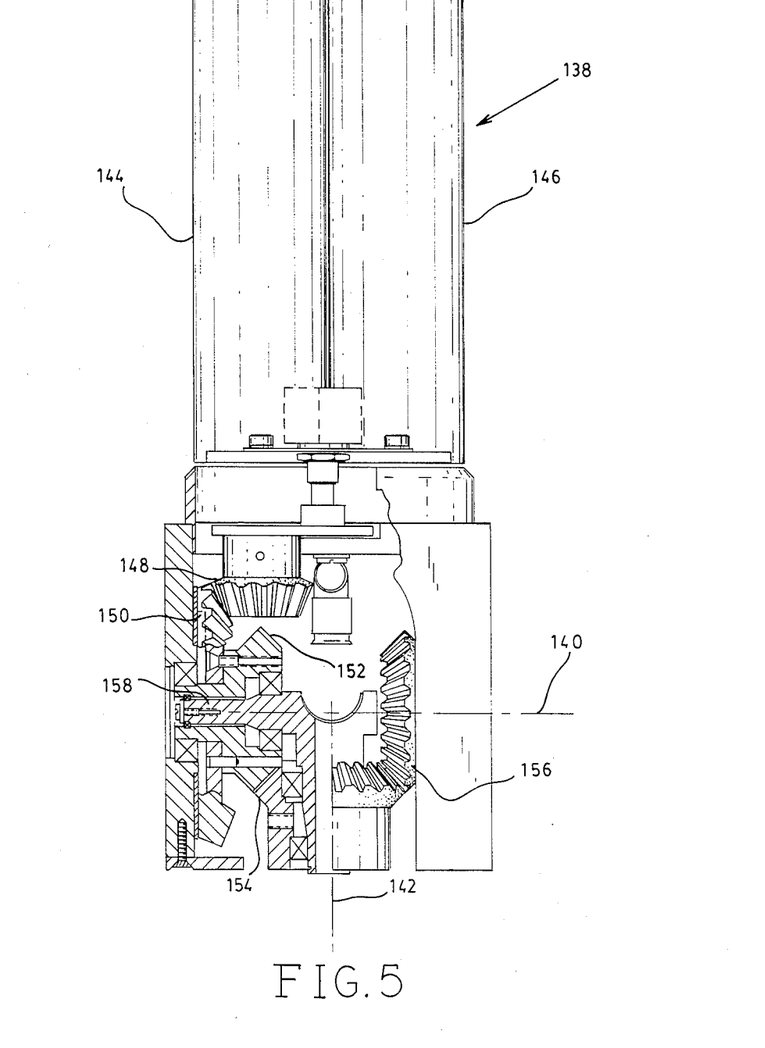
FIG. 5 is a cross-sectional drawing illustrating a differential type mechanism for producing any desired rotation and bending of the elbow or wrist of a slave arm of the manipulator.

Illustrated in FIG. 5 is a drive mechanism 138 that can be utilized for either the elbow 42 or the wrist 50 of the slave portion of the manipulator. This drive mechanism provides for rotation about either, or both, of two axes 140, 142. Rotation about axis 140 provides for the bending at the joint, and rotation about axis 142 provides for rotation of the next component along the slave arm. The motions are achieved through the use of motors 144, 146. Although not shown, each of the motors is provided with a suitable position indicator, such as a potentiometer. Connected to the output shaft of motor 144 is a bevel or pinion gear 148 which is enmeshed at right angles with a bevel gear 150. Gear 150 is directly connected to bevel gear 152 which, in turn, is meshed with bevel gear 154 that is the rotatable output member of the system which is attached to the upper end of the forearm unit 46 (or the upper end of the hand 52). The bevel gear 154 is also meshed with the bevel gear 156 at the other side thereof.

In a similar manner, the second motor 132 drives a plurality of bevel gears including gear 156. This gear 156 is attached to a shaft 158 that provides for the bending at the joint (elbow or wrists). When motors 144, 146 are rotating in opposite directions, their respective gear trains rotate in the same direction to provide the bending motion to the elbow or the wrist (motions 44 or 54) around the center (axis 140) of shaft 158. When motors 144, 146 are operated in the same direction, the gear trains rotate in opposite directions and thereby provide a twisting or rotating motion 48 (about axis 142) to the forearm attached to the elbow or motion 56 to the hand. Not shown in this figure are the covers for the arm portions that encase the drive units. However, the drive units are readily removable from the covers to facilitate repair or replacement of any of the drive components.

Figure 6A:
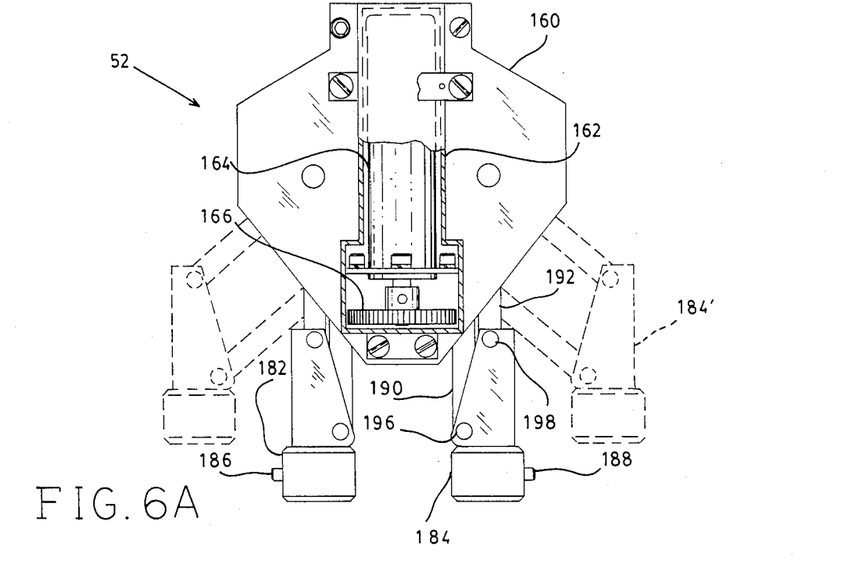
FIGS. 6A and 6B are partial cross-sectional drawings illustrating the hand and "fingers", i.e. the tongs, of the slave arm.
Figure 6B:
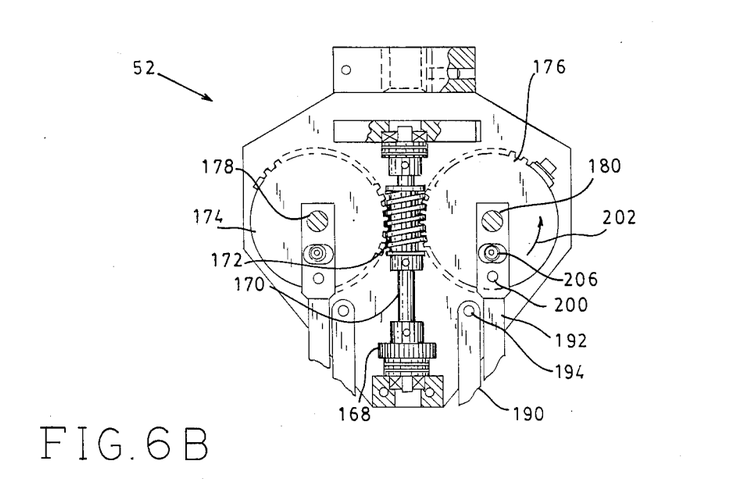

Two partial cross-sectional views of a hand unit 52 of the present invention are shown in FIGS. 6A and 6B. This hand unit is adopted to be releasably attached to a wrist unit (see FIG. 4) at the output member 154 thereof. The hand has a general enclosure 160 with a supplimentary enclosure 162 that encases a drive motor 164 and a drive gear 166. Within enclosure 160 is another gear 168 that meshes with gear 166 so as to rotate shaft 170 and worm gear 172. This worm gear 172, in turn, drives pinion gears 174, 176 that rotate about pivot pins 178, 180.

The hand unit 52 is provided with two "finger" supports 182, 184. Each of these supports are releasably receptive of a "finger" (not shown) that is held therein with screws 186, 188 to form the "tong" of the manipulator. Both supports are moved parallel to each other in an identical manner; therefore only one (e.g. support 184) will be described in detail. This support is mounted on the ends of two parallel-operating arms 190, 192. Arm 190 pivots at its opposite ends on pivot members 194, 196, while arm 192 pivots at its opposite ends on pivot pin 180 and pivot member 198. This second arm 192 is pinned to gear 176 as at 200 so that as gear 176 is caused to rotate in a direction indicated by arrow 202, the arm 192 (and arm 190) and the finger support 184 are moved toward the position indicated at 184'. A slot 204 and a cap screw 206 permit adjustment of arm 192 so that synchronous motion of the pivot arms is achieved in both directions. Thus, the fingers are opened or closed in the direction 62 (see FIG. 1).

Figure 7A:
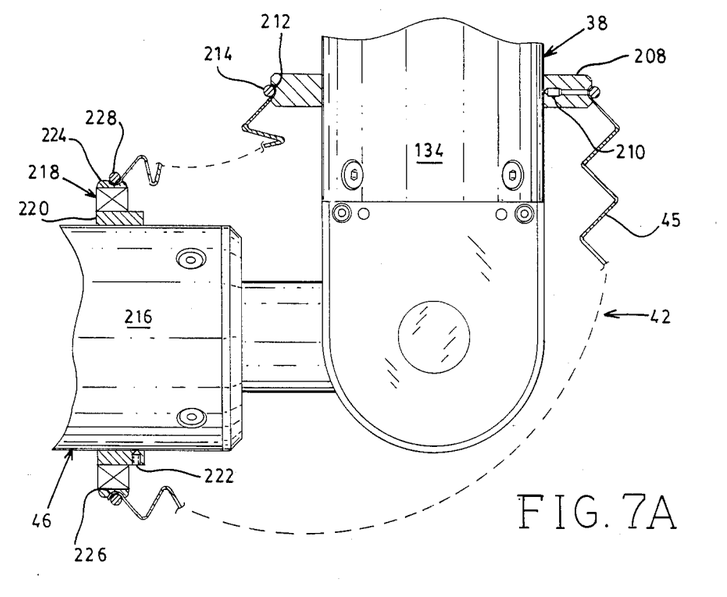
FIG. 7A is a drawing depicting a rotatable "boot" for enclosing the elbow joint of the slave portion of the manipulator.
Figure 7B:
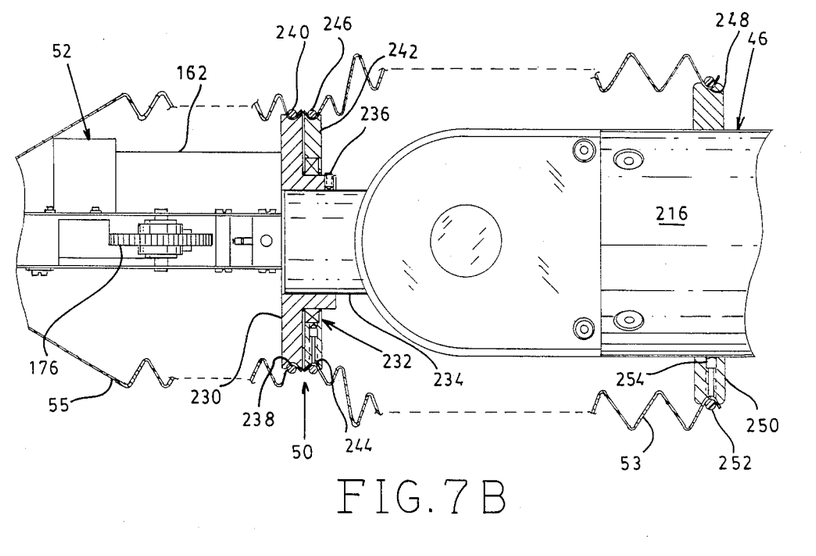
FIG. 7B is a drawing depicting a rotatable "boot" structure for enclosing the wrist joint of the slave portion of the manipulator.

Illustrated in FIGS. 7A and 7B are the boot enclosures 45, 53 and 55 used at the elbow 42 and wrist 50, respectively. For example, in FIG. 7A, the elbow joint 42 is shown between the upper arm 38 and the forearm 46. A flange 208 is fixedly attached to the upper arm cover 134 as with a set screw 210. The flange 208 is provided with a continuous groove 212 in the outer edge thereof, and the boot 45 is attached to flange with a clamping ring 214. Surrounding a cover 216 of the forearm 46 is a bearing assembly 218. This assembly has a fixed collar or inner race 220 that is secured to the cover 216 as with a set screw 222. A rotatable outer collar (outer bearing race) 224 is provided with a continuous peripheral groove 226, and the boot 45 is held therein with a second clamping ring 228. This construction prevents intrusion of external materials into the elbow unit 42. Furthermore, bending of the elbow and complete rotation of the forearm is permitted by this construction.

A somewhat similar booting arrangement is utilized at the wrist 50, as illustrated in FIG. 7B except that two boots 53, 55 are utilized to accomodate the bending and rotation at the wrist 50. For this construction there is flange 230 that forms the inner (fixed) bearing race of a bearing assembly 232. This flange is fixedly attached to output member 234 (similar to item 154 of FIG. 5) as with set screw 236. The outer periphery of flange 230 is provided with a continuous groove 238, and a clamping ring 240 secures the boot 55 to this groove. The opposite end of boot 55 is designed to seal at the tong support members (see FIG. 1) so as to exclude entry of external materials into the hand 52.

The outer race member 242 of the bearing 232 has an outer diameter equivalent to flange 230, and the outer peripheral edge is provided with a continuous groove 244. A clamping ring 246 attaches boot 53 to this outer race member at the groove 244. The opposite end of boot 53 is held in a groove 248 of a flange 250 with another ring 252. This flange is fixedly secured to the forearm cover 216 as with a set screw 254. Thus, boot 53 excludes external materials from the wrist 50 and yet permits bending at the wrist. By dividing the booting at the wrist, as shown, the hand unit 52 can be rotated, even continuously.

From a review of FIGS. 4 though 6, it will become apparent that a slave arm construction is provided that can be readily removed from the torso and replaced with an identical arm. The replacement arm can be, for example, that normally located at the further side of the torso. The major arm components are readily removed for replacement and/or maintenance by the loosening of two captive bolts. Final disassembly of individual components of the slave arm is then easily accomplished at a disassembly location within the cell by simple removal of other bolts. All of the electrical components have disconnect type plugs within the respective arm portions. As stated above, the electrical connections at the shoulders are joined or separated by placing an arm on the torso. The only external disconnect is the master connection for electrical power and signals to the torso. Thus, the disassembly steps are readily facilitated. Since both arms connected to the torso are identical, and since many parts are universally utilized in the elbow and wrist or shoulder components, a minimum of replacement parts will be required for the maintenance of the manipulator of the present invention.

As stipulated above, essentially all of the motors that are contained in the slave portion of the present manipulator are provided with position-sensing devices, e.g. encoders, resolvers or potentiometers. These position-sensing devices provide a signal for both the existance of motion of the motor as well as the direction and amount of the rotation of the motor for purposes as will be discussed hereinafter. The signals are utilized in the control system to achieve proper motion of the slave arm portions.

Figure 8:
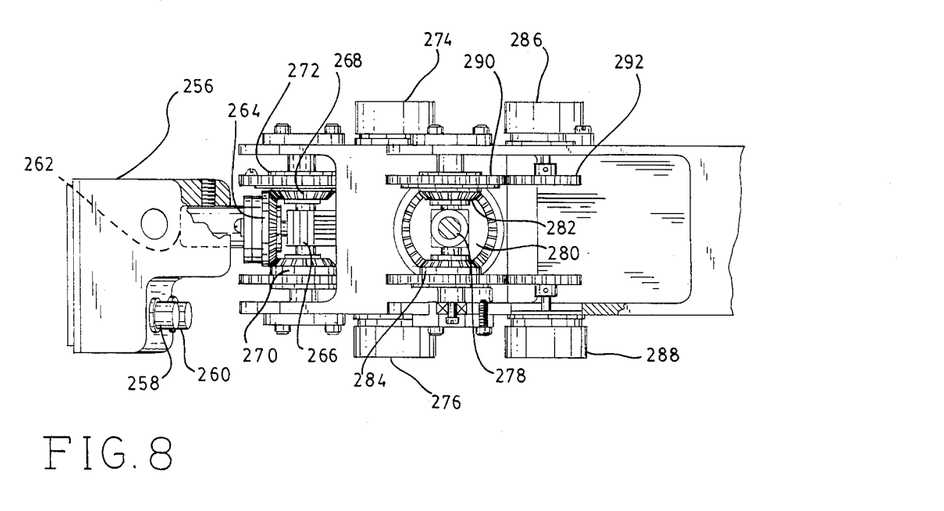
FIG. 8 is a drawing of typical joints within the master control arm of the present manipulator.

In order to better understand the control system of the present invention, a typical joint of the master portion of the manipulator, as shown generally in FIG. 2, is shown in detail in FIG. 8. In actuality this drawing shows the mechanism that typically exists at the wrist of the master unit as well as that that exists at the shoulder thereof. In this view, the master hand 256 (element 98 of FIG. 2) is provided to be grasped by an operator. The hand unit is provided with one or more switches as indicated at 258, 260. The number and type of switch will depend upon the function of each.

The hand unit is connected by way of shaft 262 to a bevel gear 264. Rotation of the hand causes rotation of the bevel gear, and elevation or depression of the hand causes the bevel gear 264 to pivot about a central common axis 266 for an additional pair of bevel gears 268, 270. Through appropriate gearing, a spur gear 272 (driven by bevel gear 268) is connected to an electrical potentiometer 274, and bevel gear 270 is likewise connected to a potentiometer 276. Thus, any rotation of bevel gears 268, 270 results in a repositioning of the potentiometer connected thereto with a resultant effective output of a master position signal to a control system. If the hand 256 is twisted, there will be a differential output with respect to the potentiometers because of the reverse direction of the bevel gears 268, 270. However, if the hand is elevated or depressed, the bevel gears 268, 270 will rotate in the same direction and produce a corresponding output through their potentiometers.

As stated above, this figure also shows the mechanism existing at the shoulder 88 of the master arm. Rotation of the upper arm 90 occurs about a central pivot point 278. Any motion of the upper arm is reflected in the repositioning of the bevel gear 280 that is enmeshed with a pair of addtitional bevel gears 282, 284. As in the case of the gears in the wrist portion, gears 282, 284 can rotate in the same direction, in opposite directions, or either direction with different speeds. These bevel gears are connected respectively to potentiometers 286, 288.

Illustrated in this drawing is a mechanism for connecting the bevel gears to the potentiometer. Typically this is accomplished through spur gears 290, 292. The latter of these gears is mounted on the shoulder 80 whereby the differential relationship between the upper arm and the shoulder will be determined. The signals derived from potentiometers 286, 288 reflect the rotational relationship between the upper arm and the shoulder as well as the angular difference between the same.

Figure 9A:
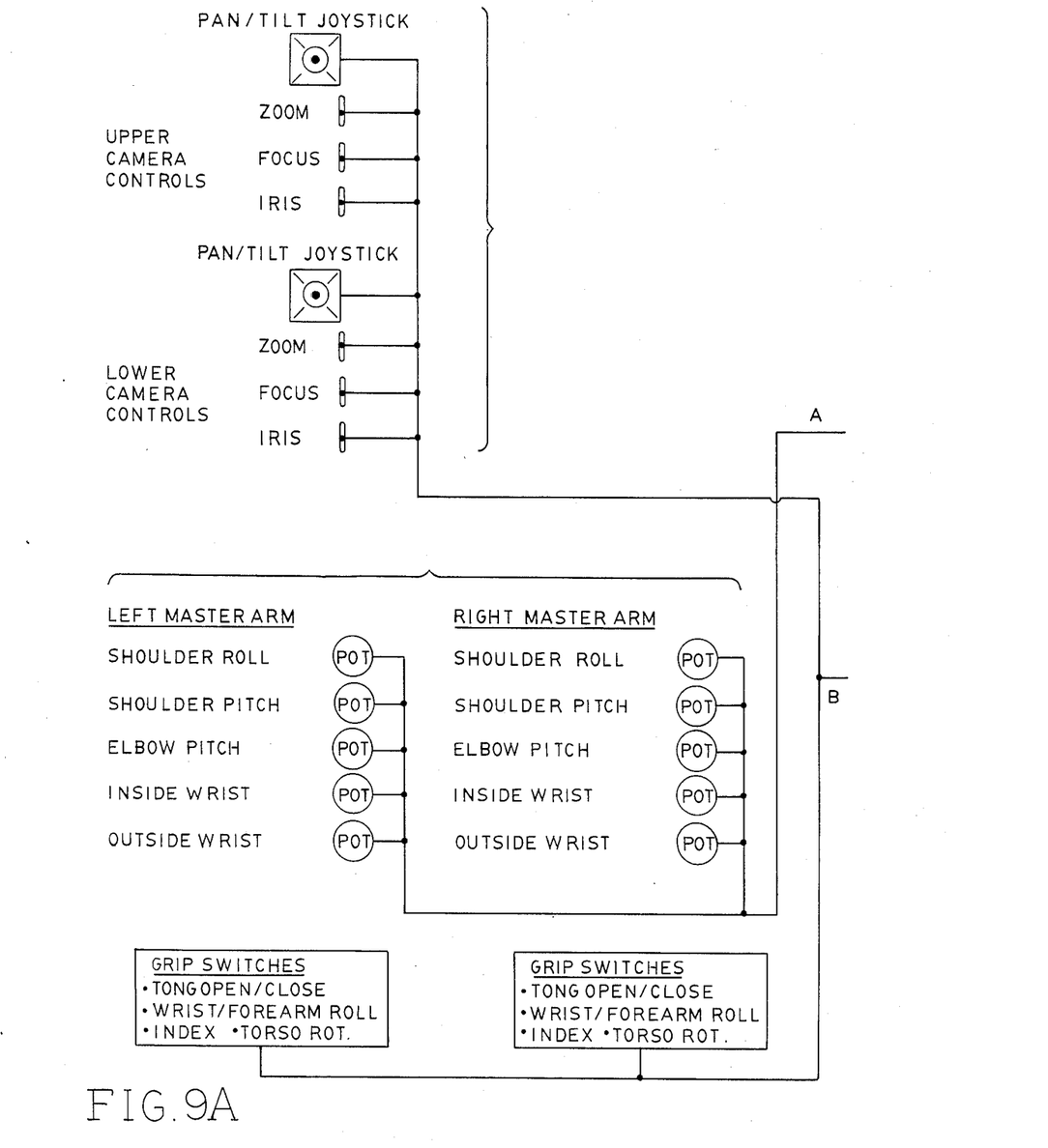
FIGS. 9A-9C are a schematic wiring and block diagram of a control circuit for use with the remote manipulator.
Figure 9B:
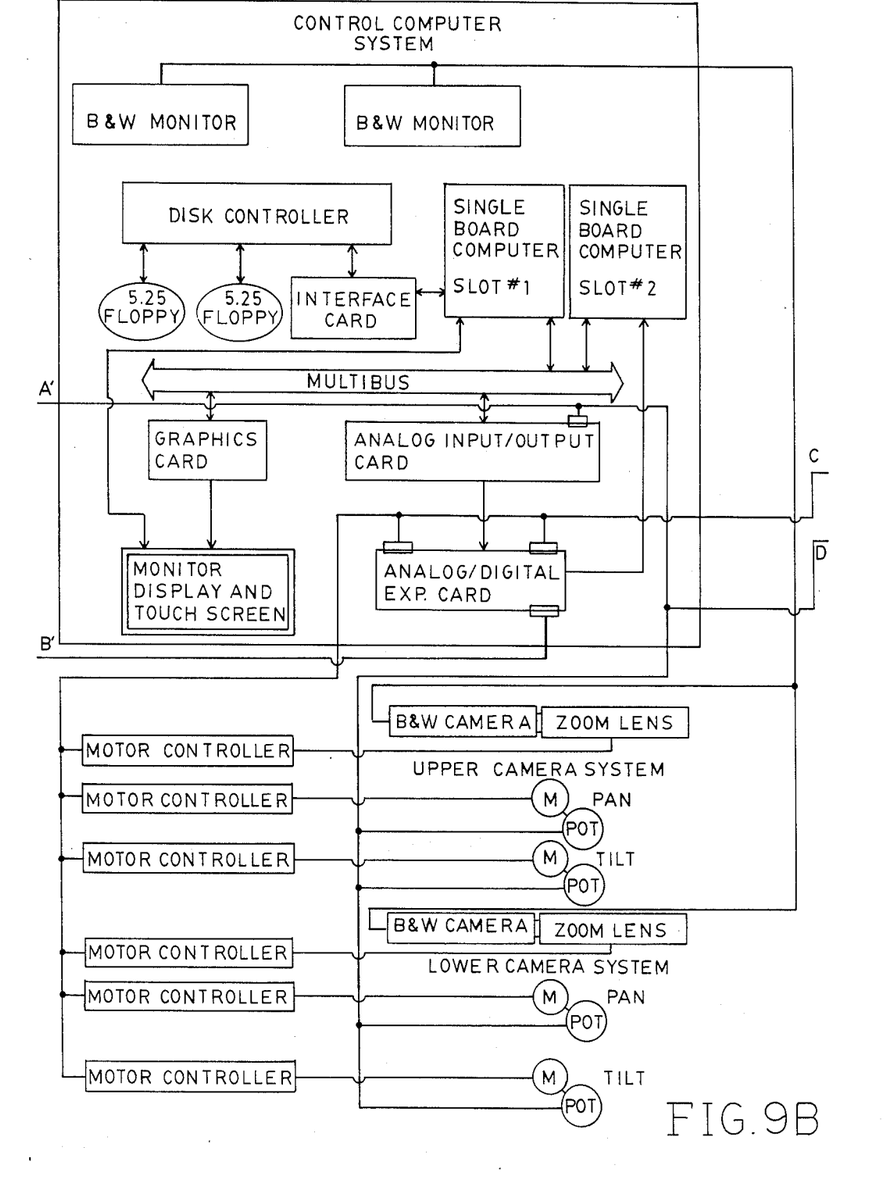
Figure 9C:
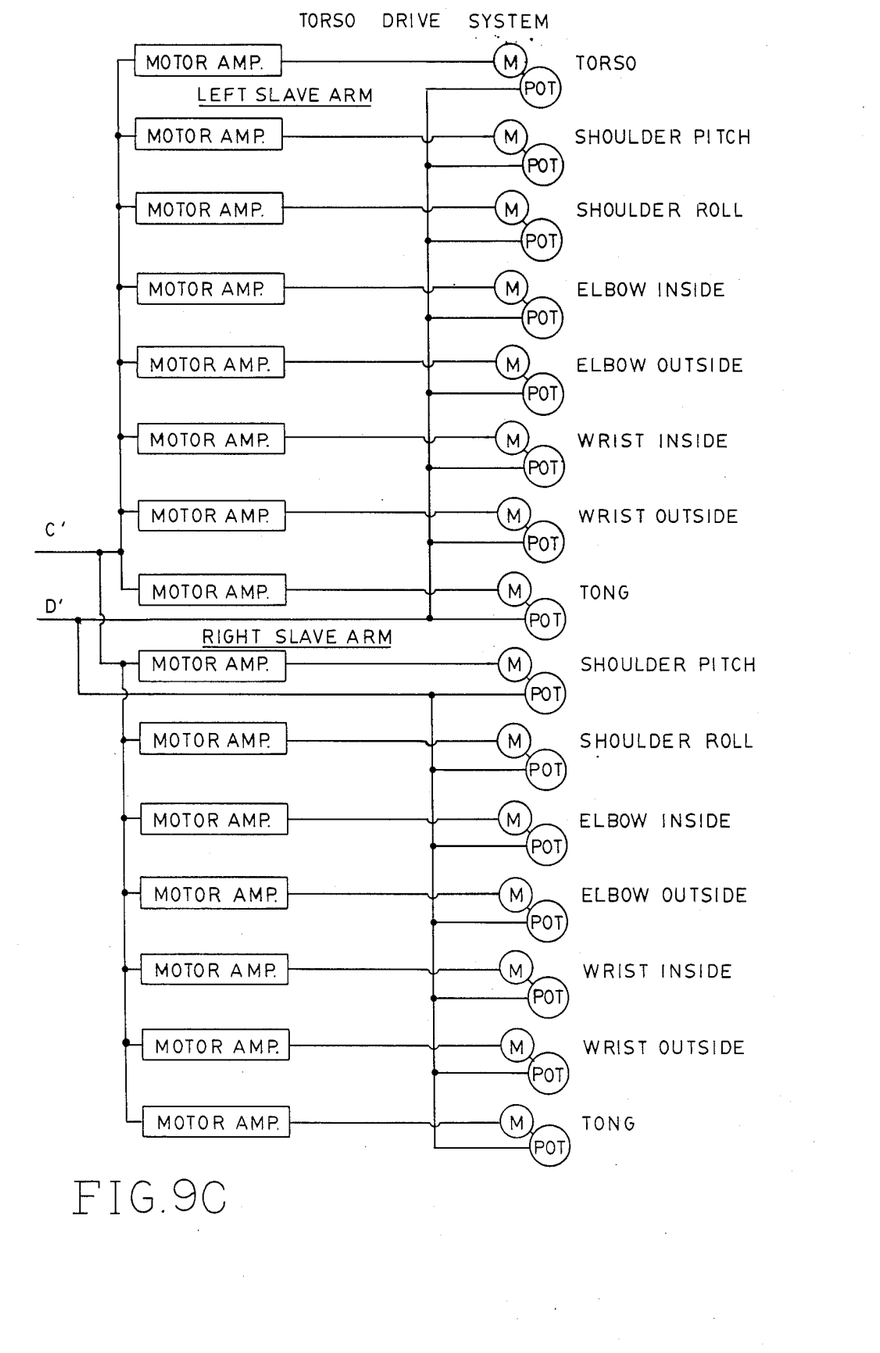

A schematic wiring diagram of the present invention is illustrated in FIGS. 9A–9C. Referring to these figures, control of the device will be understood by those versed in the art. Also, although a single lead is shown connecting each component, it will be understood by one versed in the art that the circuit contains the number of leads needed for the components to perform their functions.

Shown in the upper portion of FIG. 9A are the control switches for the operation of the two video cameras on the upper and lower pan/tilt units. These controls are typically mounted on the control panel (see FIG. 2) and include a "joystick" for positioning the camera, and various switches to control the camera lenses. In the lower portion of this figure are shown the various potentiometers that are in the master arm units (see FIG. 8). Also indicated are the various switches carried by the hand (grip) of the master arm unit that provide for tong operation, roll of wrist/forearm, indexing and torso rotation. The outputs of both of these sub-sections of the "active" operation performed by an operator are fed into components within the control computer system illustrated in the upper portion of FIG. 9B.

The control computer system is also typically contained within the control cabinet. Provision is made in this system such that pre-programmed operation of the slave arm can be achieved without input through the master arm units. Also, the position signals for a given video camera are processed and directed to the circuits shown in the lower portion of FIG. 9B to indicate how the direction of the camera(s) and appropriate settings are achieved. The camera(s) can be made to track the movement of the slave hand if desired.

Shown in FIG. 9C are the circuits for the left and right slave arms as well as the torso. The individual motors and pots are shown that exist to produce and measure, respectively, the various motions of the torso and arm components. These circuit systems operate on an error signal for the most part. The master units, other operator-manipulated controls or the preprograms in the computer generate signals according to a desired operation of the slave components (torso, arms, pan/tilt units). Those slave units generate positional-related signals. The computer compares the two positional signals and generates the necessary operating signals to position the slave components properly. This motion can be intermittant when the input is intermittant; or continuous when the input is continuous (as with the wrist/forearm roll). Thus, the slave components follow fully the positional input information given to the computer system.

A further feature of the control system is that of enabling the slave portion of the subject manipulator to have extended motion which is beyond the normal reach capability of an operator's arm. This capability, referred to as "ratcheting" or "indexing", is accomplished by the operator depressing one of the appropriate forementioned switches on the hand of the master unit. When this switch is depressed, then released, power to the particular slave arm is interrupted; however, the computer retains the information as to the position of the slave. No correction signal is entered as the master unit is returned to a less extended or "nominal" position. Then, upon pressure and releasing the switch a second time, the operator can again move the master unit in the appropriate direction and the slave unit responds with equal movement which is added to the movement previously accomplished.

Thus, the slave arms can be moved, i.e., ratcheted, into positions that would be impossible to reach if the slave units responded only to the motions of the master unit.

Having described the mechanical and electrical features of the present invention, in which some of the operational characteristics of the device are described, an overall description of the operation provides a better understanding of the present development to those versed in the art. Referring principally to FIG. 2, the slave portion of the manipulator is mounted within an enclosed cell where its position can be viewed by means of a visually transparent window or by remote television, or both. As specified, the slave unit can be supported from a monorail, a crane, or the like within the cell which will provide for general vertical and horizontal positioning thereof. An operator located in a safe environment positions himself/herself with respect to the master unit such that each hand unit thereof corresponds to the right or left hand of the operator. While watching the particular movement of the slave hands through the window or on the television screen, the operator moves the hands and arms of the master unit to accomplish corresponding moves of the slave arms in the cell. As the hands of the master rotate or are elevated or depressed, corresponding movement occurs of the hands of the slave unit. As discussed above, a toggle switch on the hand of the master unit is utilized to actuate the tongs of the slave hand when such operation is desired. It can be seen that the right and left arm of the same unit can be moved independently of each other, at different times, at different speeds, and in different directions. When it is desirable to move the slave units beyond the normal movement of an operator's arm and/or hand, as in going from an elbows down to elbows up position, the operator can lock out the control system by use of the appropriate switch on the hand and return the master arms to a normal position. Then when that switch is released, movement of the master arms and/or hands again causes motion of the equivalent portions of the slave units beginning at their previous set points and moving them to an extended position. By this means the slave units can be moved to an otherwise inaccessible portion of the cell to accomplish various tasks therein.

It should be pointed out that the aim of the video cameras and their associated illumination device can be made to follow the positions of the hands of the slave portion of the manipulator. This is accomplished by the afore-mentioned controls on the console. Accordingly, if the slave hands reach into the upper portion of the cell, the cameras and lights can be elevated to properly view the operation of the hands at that location.

From the foregoing description, it will be understood by those versed in the art that an advanced type of remote manipulator is provided. Each of the major portions of the slave unit of the manipulator can be readily removed within the cell for replacement and/or maintenance. The motions available in an individual arm of the manipulator permit various operations to be performed on the other arm and thereby reduce the necessity for a separate manipulator for maintenance purposes. With the right and left arm being identical, they can be interchanged for use if one becomes disabled. It also eliminates a number of replacement parts that must be stocked. In addition, a substantial portion of the components are readily available in the market place and therefore the cost of the present invention is substantially reduced over the units which require specially fabricated components. Through the use of ratcheting, this device has extended reach capabilities which go beyond the reach capabilities of an operator. The structure of the slave units is designed to provide a weight-to-lift ratio approaching 1:1 which is unique in the field of remote manipulators.

It is of course understood that although a preferred embodiment of the present invention has been illustrated and described, various modifications thereof will become apparent to those skilled in the art. Accordingly a scope of the invention should be defined only by the appended claims and their equivalents.

We claim:

1. An all electrically operated slave manipulator system characterized by having extended reach and interchangable components by being remotely maintainable and repairable, comprising:

a torso element having at least rotary positional adjustment about a vertical axis;

a pair of identical and interchangeable articulated slave arms each releasably attached to opposite sides of said torso, each of said articulated slave arms having a shoulder joint portion adapted for rotation about a horizontal axis, an upper arm portion having a first end releasably and rotatably attached to said shoulder joint portion and adapted for rotation about its own axis, a forearm portion releasably and pivotally attached at a first end to a further end of said upper arm with an elbow joint portion, said forearm portion adapted for rotation about its own axis, a hand portion including at least a pair of fingers adapted for movement toward and away from each other, said hand portion being releasably and pivotally attached by a wrist joint portion at a further end of said forearm portion and adapted for full rotation about its own axis, said articulated slave arms each provided with electrically operated drive assemblies for carrying out pivotal and rotary motions of portions thereof at said joint portions, each of said drive assemblies being provided with means for producing electrical signals corresponding to operation of said drive assemblies;

at least one pan/tilt unit releasably attached to said torso, said pan/tilt unit carrying a video camera, said pan/tilt unit provided with drive means for effecting aim of said camera and with means to produce signals as to directions of said aim; and electrical connector means carried by said torso and by each said slave arms, said electrical connector means having a first half attached to said torso and a second and complimentary half attached to each said slave arms whereby attachment of each said slave arms to said torso interconnects said first half with said second complimentary half, and separation of said slave arms from said torso separates said connector means.

2. The slave manipulator system of claim 1 further comprising a flexible boot encasing each of said elbow and wrist joints of said slave arms, one end of each said boots being rotatable with respect to a support surface for said rotatable end.

3. The slave manipulator system of claim 1 further comprising a source of control signals for said drive assemblies, said source of control signals releasably connected to said system at said torso.

4. The slave manipulator system of claim 3 wherein said source of control signals comprises:

a master unit operable by a user, said master unit being provided with;

a frame;

a pair of articulated master arms for positioning one at each side of said user, each of said articulated master arms having a hand unit, a forearm unit, a wrist joining said hand unit to said forearm unit, an upper arm unit attached to said forearm unit with an elbow unit, and a shoulder unit connecting said upper arm to said frame, whereby said user grasping said hand units of said master arms can impart rotary and angular motions to selected portions of said articulated master arms in relation to movement of said user, each of said wrist, elbow and shoulder joint units being provided with means for generating electrical signals proportional to positions of said joint units; and a control circuit electrically connected with said master unit and said slave unit, said control circuit adapted to receive said position signals from said master unit and said drive assembly movement signals from said slave unit and selectively generate movement initiating signals to said drive assemblies when selected differences exist between said position signals and said drive assembly movement signals to null said differences, said control circuit further providing signals for moving said pan/tilt unit to effect said aim of said camera mounted thereto.

5. The slave manipulator system of claim 4 wherein said control circuit includes:

switch means for selective operation by said user for interrupting interconnection of said position signals from said master unit to said drive assemblies of said slave arms and interrupting interconnection of said operation signals from said drive assemblies to said control circuit, whereby said slave arms can be maintained in a fixed position while said master arms are moved to a new position, said switch when not operating permitting the simultaneous movement of said slave arms according to movement of said master arms and thereby providing for extension of said slave arms into positions not attainable with said master arms.

6. An all electric remote manipulator system characterized by being remotely maintainable and repairable, comprising:

a master unit operable by a user, said master unit being provided with a. a frame;

b. a pair of articulated master arms for positioning one at each side of said user, each of said articulated master arms having a hand unit, a forearm unit, a wrist joining said hand unit to said forearm unit, an upper arm unit attached to said forearm unit with an elbow unit, and a shoulder unit connecting said upper arm unit to said frame, whereby said user grasping said hand units of said master arms can impart rotary and angular motions to selected portions of said articulated master arms in relation to movement of said user, each of said wrist, elbow and shoulder joint units being provided with with means for generating electrical signals proportional to positions of said joint units;

a slave unit operable by signals derived from said master unit, said slave unit being provided
  a. a torso element having at least rotary positional adjustment about a vertical axis;
  b. at least one pan/tilt unit releasably attached to said torso, said pan/tilt unit carrying a video camera, said pan/tilt unit provided with drive means for effecting aim of said camera and with means to produce signals as to directions of said aim;
  c. a pair of identical and interchangeable articulated slave arms each releasably attached to opposite sides of said torso, each of said articulated slave arms having a shoulder joint portion adapted for rotation about a horizontal axis, an upper arm portion having a first end releasably and rotatably attached to said shoulder joint portion and adapted for rotation about its own axis, a forearm portion releasably and pivotally attached at a first end to a further end of said upper arm with an elbow joint portion, said forearm portion adapted for rotation about its own axis, a hand portion, including at least a pair of fingers adapted for movement toward and away from each other, said hand being releasably and pivotally attached by a wrist joint portion at a further end of said forearm portion and adapted for full rotation about its own axis, said elbow joint portion and said wrist joint encased in a flexible boot, said articulated slave arms each provided with electrically operated drive assemblies for carrying out pivotal and rotary motions of portions thereof at said joints portions, each of said drive assemblies being provided with means for producing electrical signals corresponding to operation of said drive assemblies; and a control circuit electrically connected with said master unit and said slave unit, said control circuit adapted to receive said position signals from said master unit and drive assembly movement signals from said slave unit and selectively generate movement initiating signals to said drive assemblies when selected differences exist between said position signals and said drive assembly movement signals to null said differences, said control circuit further providing signals for moving said pan/tilt unit to effect said aim of said camera mounted thereto.

7. The remote manipulator system of claim 6 further comprising:
selective means associated with said master unit and said control circuit for effectively disabling said drive assembly movement signals upon engagement of said selective means whereby said master unit can be moved to a less extended position without movement of said slave unit and whereby said slave unit can be moved to extended positions upon disengagement of said selective means and further movement of said master unit in a more extended direction.

8. The remote manipulator system of claim 6 wherein:
said drive assemblies include reversable motors and gear trains connected thereto;
said means for producing signals corresponding to operate of said drive assemblies are potentiometers connected to each motor; and
said means for producing position signals of said master unit are potentiometers operable by movement of components of said master unit.

9. The remote manipulator of claim 6 wherein said pair of articulated slave arms are releasably secured to said torso with remotely operable captive bolts and at least one alignment pin, and electrical connection means to said slave arms include disconnect plug portions carried on said torso and on said slave arms whereby joining said slave arms to said torso interconnect said plug portions.

10. The remote manipulator system of claim 8 wherein said rotary motion of said shoulder portion is provided by one of said motor and gear trains mounted at the juncture of said shoulder portion and said torso; wherein said rotary motion of said upper arm portion is provided by one of said motor and gear trains mounted at the juncture of said upper arm portion and said shoulder portion; wherein said rotary motion of said forearm and pivotal movement thereof with respect to said upper arm portion is provided by one of said motor and gear trains at the juncture of said upper arm and said forearm, with a pair of motors thereof operable in common or opposite directions through a differential unit whereby the associated gear train provides both motions; wherein said rotary motion of said hand and pivotal movement thereof with respect to said forearm is provided by one of said motor and gear trains at the juncture of said hand and said forearm, with a pair of motors thereof operable in common or opposite directions through a differential unit whereby the associated gear train provides both motions; and wherein said motion of said finger is provided by a electrical motor within said hand and gear members connected by parallel bars to said fingers.

11. The remote manipulator of claim 6 wherein said boot at said elbow comprises:
  a radial flange affixed to said upper arm unit proximate said elbow, said radial flange provided with a continuous groove in an outer edge thereof;
  a bearing assembly affixed to said forearm proximate said elbow, said bearing assembly having an inner race attached to said forearm and a rotatable outer race, said outer race provided with a continous groove in an outer edge thereof;
  a flexible boot member encasing said elbow and extending from said radial flange to said bearing assembly; and
  ring means encircling ends of said boot member for attaching said boot member to said groove in said flange member and to said groove in said outer race of said bearing assembly.

12. The remote manipulator of claim 6 wherein said boot at said wrist comprises:
  a second radial flange affixed to said forearm proximate said wrist, said second radial flange provided with a continuous groove in an outer edge thereof;
  a second bearing assembly affixed to said hand at said wrist, said bearing assembly having an inner race attached to said wrist and an outer race, said inner race having a radially extending flange, said outer race and said flange of said inner race each provided with a continuous groove in an outer edge thereof;
  a second flexible boot member encasing said wrist extending from said flange on said forearm to said outer race of said second bearing assembly;

further ring means encircling said second boot member for attaching said second boot member to said groove in said outer race of said second bearing assembly and to said groove in said second flange.

13. The remote manipulator of claim 12 further comprising a third flexible boot member encircling said hand, said third boot member attached proximate said fingers and extending to said flange of said inner race of said second bearing assembly, and ring means encircling said third boot member for attaching said third boot member to said groove of said flange of said inner race of said second bearing assembly.

14. The remote manipulator system of claim 7 wherein said selective means is a switch on said hand of said master arms for operation by said user, said switch when operated disabling power to motors of respective of said slave unit arms permitting said master arms to be moved without changing position of said slave arms.

15. An all electric remote manipulator system characterized by being remotely maintainable and repairable, comprising:

a master unit operable by a user, said master unit being provided with
  a. a frame;
  b. a pair of articulated master arms for positioning one at each side of said user, each of said articulated master arms having a hand unit, a forearm unit, a wrist joining said hand unit to said forearm unit, an upper arm unit attached to said forearm unit with an elbow unit, and a shoulder unit connecting said upper arm unit to said frame, whereby said user grasping said hand units of said master arms can impart rotary and angular motions to selected portions of said articulated master arms in relation to movement of said user, each of said wrist, elbow and shoulder joint units being provided with potentiometer means for generating electrical signals proportional to positions of said joint units;

a slave unit operable by signals derived from said master unit, said slave unit being provided with
  a. a torso element having at least rotary positional adjustment about a vertical axis;
  b. a pair of pan/tilt units releasably attached to said torso, said pan/tilt units each carrying a video camera, said pan/tilt units provided with drive means for effecting aim of said camera and with means to produce signals as to directions of said aim;
  c. a pair of identical and interchangeable articulated slave arms each releasably attached to opposite sides of said torso, each of said articulated slave arms having a shoulder joint portion adapted for rotation about a horizontal axis, an upper arm portion having a first end releasably and rotatably attached to said shoulder joint portion and adapted for rotation about its own axis, a forearm portion releasably and pivotally attached at a first end to a further end of said upper arm with an elbow joint portion, said forearm portion adapted for rotation about its own axis, a hand portion, including at least a pair of fingers adapted for movement toward and away from each other, said hand being releasably and pivotally attached by a wrist joint portion at a further end of said forearm portion and adapted for full rotation about its own axis, said elbow joint portion and said wrist joint encased in a flexible boot, said articulated slave arms each provided with electrically operated reversable motor and gear train drive assemblies for carrying out pivotal and rotary motions of portions thereof at said joints portions, each of said drive assemblies being provided with potentiometer means for producing electrical signals corresponding to operation of said drive assemblies; and d. electrical connecting means associated with junctions of said slave arms with said torso, said electrical connecting means each having a first pair of half connectors attached to said torso and a second pair of complimentary half connectors attached to said slave arm whereby attachment of each said slave arms to said torso interconnects said first halves with said second halves, and separation of said slave arms from said torso separates said connector means; and a control circuit electrically connected with said master unit and said slave unit, said control circuit adapted to receive said position signals from said master unit and drive assembly movement signals from said slave unit and selectively generate movement initiating signals to said drive assemblies when selected differences exist between said position signals and said drive assembly movement signals to null said differences, said control circuit further providing signals for moving said pan/tilt unit to effect said aim of said camera mounted thereto.

16. The remote manipulator system of claim 15 further comprising:

selective means associated with said master unit and said control circuit for effectively disabling said drive assembly movement signals upon engagement of said selective means whereby said master unit can be moved to a less extended position without movement of said slave unit and whereby said slave unit can be moved to extended positions upon disengagement of said selective means and further movement of said master unit in a more extended direction.

17. The remote manipulator system of claim 15 wherein said rotary motion of said shoulder portion is provided by one of said motor and gear trains mounted at the juncture of said shoulder portion and said torso; wherein said rotary motion of said upper arm portion is provided by one of said motor and gear trains mounted at the juncture of said upper arm portion and said shoulder portion; wherein said rotary motion of said forearm and pivotal movement thereof with respect to said upper arm portion is provided by one of said motor and gear trains at the juncture of said upper arm and said forearm, with a pair of motors thereof operable in common or opposite directions through a differential unit whereby the associated gear train provides both motions; wherein said rotary motion of said hand and pivotal movement thereof with respect to said forearm is provided by one of said motor and gear trains at the juncture of said hand and said forearm, with a pair of motors thereof operable in common or opposite directions through a differential unit whereby the associated gear train provides both motions; and wherein said motion of said fingers is provided by a electrical motor within said hand and gear members connected by parallel bars to said fingers.

18. The remote manipulator system of claim 16 wherein said selective means is a switch on said hand of said master arms for operation by said user, said switch when operated disabling power to motors of respective of said slave unit arms permitting said master arms to be moved without changing position of said slave arms.

* * * * *